A. WALKER.
GANG PLOW.
No. 80,521.    Patented July 28, 1868.
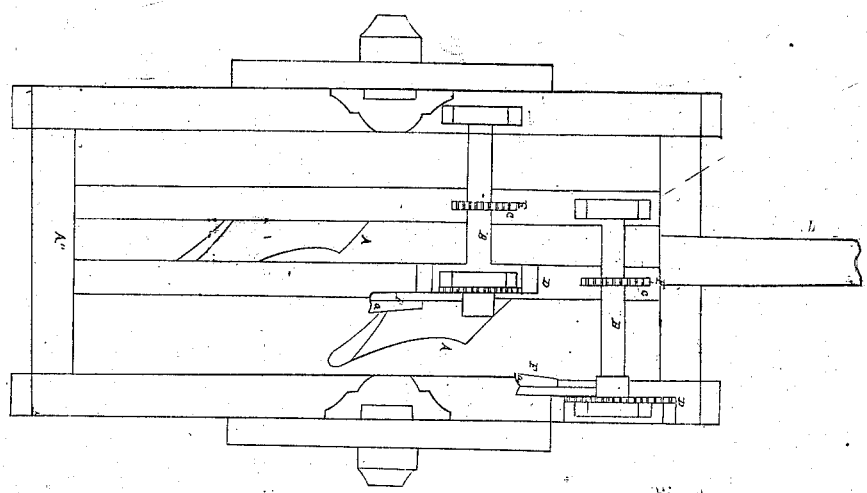
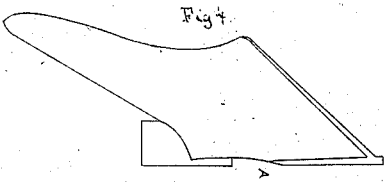
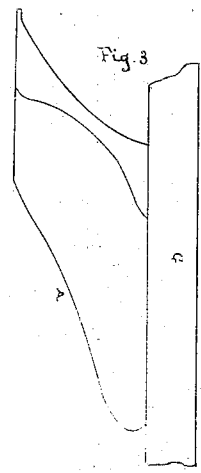
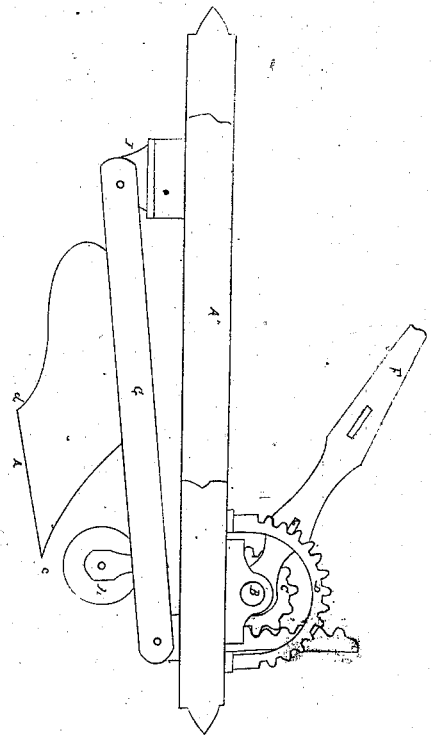
Witnesses:
H. S. Banks
Wm Pettingell
Inventor:
Andrew Walker

United States Patent Office.

ANDREW WALKER, OF CLAREMONT, NEW HAMPSHIRE.

Letters Patent No. 80,521, dated July 28, 1868.

IMPROVEMENT IN GANG-PLOW

The Schedule referred to in these Letters Patent and making part of the same.

TO ALL WHOM IT MAY CONCERN:

Be it known that I, ANDREW WALKER, of Claremont, in the county of Sullivan, and State of New Hampshire, have invented certain Improvements in Gang-Plows; and I do hereby declare that the following is a full and exact description thereof, which will enable those skilled in the art to make and use the same, reference being had to the accompanying drawings, and letters of reference marked thereon, in which—

Figure I is a top view, showing the different parts of my improvement.

Figure II is a side view of the frame and the adjustable plow-beam—

The letters of reference indicating similar parts in all the figures.

The improvements herein referred to consist of—

First, the use of one or more plows, suspended at the centre of the frame, thus preventing the dragging of the plow. I am well aware that one or more plows have been fastened to a frame, but they have been set behind the centre, being dragged along instead of carried. In my improvement the plows are carried, not dragged, doing away with all unnecessary friction.

Second, the use of an adjustable plow-beam. The beam is pivoted to the frame at I, and suspended by the ratchet E, allowing of an easy and convenient adjustment up or down. The ratchet is raised or lowered by the gear-wheel C, attached to the lever F. The action of raising the lever lowers the plow, and lowering it, raises the plow out of the ground, clearing it from the surface. The spring-catch $b$ catching into the ratchet-circle, shown in Fig. II, permits the plow to be gauged to run at any depth.

The following is a description of the construction and operation of my said improvements:

Fig. I are plowshares, suspended in centre of frame A'', to adjustable beams G, as shown in Fig. II.

B B are shafts, passing from one beam of frame to another, to attach the mechanism for raising or lowering the plows.

C C, the gear-wheels attached to the shaft B, to work the ratchet E.

D D, the ratchet-circle, to hold the spring-catch $b$ at any point of adjustment, as shown in Fig. II.

E E, the ratchet, for suspending the adjustable plow-beams, as shown in Fig. II at E.

F F, levers, to raise or lower the plows.

$a\ a$, spring-catches, as shown in Fig. II.

A, plowshare; A'', frame; B', journal of shaft B; C, gear-wheel; D, ratchet-circle; E, ratchet, to suspend adjustable beam G; F, lever, with its catch $b$.

What I claim as my invention, and desire to secure by Letters Patent, is—

1. A stationary frame, with adjustable plow-beams underneath, pivoted to the main frame at the rear end, and suspended by the ratchet E.

2. In combination, the gear-wheel C, gear-circle D, lever F, and spring-catch $b$, in combination with the ratchet E, for the purpose of adjusting the depth of the furrow, and locking or suspending the plows at an given point, the whole arranged, constructed, and combined, and used in combination with and for the purpc set forth.

ANDREW WALKER.

Witnesses:
WM. PETTINGELL,
L. FORD.